United States Patent [19]

Terada

[11] Patent Number: 5,411,557
[45] Date of Patent: May 2, 1995

[54] TEXTILE PRINTING PROCESS

[75] Inventor: Yukio Terada, Amagasaki, Japan

[73] Assignee: King Printing Co., Ltd., Osaka, Japan

[21] Appl. No.: 145,313

[22] Filed: Nov. 3, 1993

Related U.S. Application Data

[63] Continuation of Ser. No. 31,021, Mar. 11, 1993, abandoned, which is a continuation of Ser. No. 899,150, Jun. 17, 1992, abandoned, which is a continuation of Ser. No. 662,509, Feb. 28, 1991, abandoned, which is a continuation of Ser. No. 420,747, Oct. 13, 1989, abandoned, which is a continuation of Ser. No. 245,954, Sep. 15, 1988, abandoned, which is a continuation of Ser. No. 927,976, Nov. 7, 1986, abandoned.

[30] Foreign Application Priority Data

| Nov. 21, 1985 | [JP] | Japan | 60-262257 |
| Nov. 21, 1985 | [JP] | Japan | 60-262258 |
| Dec. 24, 1985 | [JP] | Japan | 60-291533 |
| Aug. 13, 1986 | [JP] | Japan | 61-190331 |

[51] Int. Cl.$^6$ .............................................. D06P 5/08
[52] U.S. Cl. .......................................... 8/444; 8/543; 8/449; 8/552; 8/611; 8/597; 8/586; 8/618; 8/557; 8/476; 8/486; 8/495
[58] Field of Search ................. 8/445, 449, 543, 444, 8/449, 416, 552, 557, 611, 618, 597, 586, 543; 106/22 E, 28 R

[56] References Cited

U.S. PATENT DOCUMENTS

| 1,954,451 | 4/1934 | Lawrence | 8/469 |
| 2,111,479 | 3/1938 | Ochwat | 548/148 |
| 2,541,178 | 2/1951 | Slifkin | 95/2 |
| 2,583,286 | 1/1952 | Albini-Colombo | 8/470 |
| 2,623,821 | 12/1952 | Isherwood | 95/2 |
| 2,756,144 | 7/1956 | Ravich | 95/6 |
| 3,700,402 | 10/1972 | Noda | 8/449 |

FOREIGN PATENT DOCUMENTS

| 727594 | 2/1966 | Canada | 204/97 |
| 2530349 | 1/1977 | Germany | |
| 61-63790 | 4/1986 | Japan | |
| 434450 | 9/1935 | United Kingdom | |
| 651324 | 3/1951 | United Kingdom | |
| 686231 | 1/1953 | United Kingdom | |
| 647105 | 12/1960 | United Kingdom | |
| 1284824 | 8/1972 | United Kingdom | |

OTHER PUBLICATIONS

H. Zollinger, "Color Chemistry", (VCH), 1987, p. 1 no month available.

J. Lenoir in Venkataraman's "The Chemistry of Synthetic Dyes", vol. V, (Academic Press), 1971, p. 314 no month Available.

Primary Examiner—Paul Lieberman
Assistant Examiner—Margaret Einsmann
Attorney, Agent, or Firm—Armstrong, Westerman, Hattori, McLeland & Naughton

[57] ABSTRACT

A printing process wherein the surface of a fabric is subjected to lithography or relief printing and subsequently to aftertreatment including steaming, soaping and rinsing and which is characterized in that the process employs an ink comprising:
(a) a coloring agent comprising a dye prepared by rendering a fiber-reactive water soluble dye insoluble and/or oleophilic, and
(b) a vehicle comprising
(I) a lithographic oily varnish and/or
(II) a glycol varnish and/or an amino alcohol varnish containing at least one of hydrotroping agent, neutral sodium salt, surfactant, basic material, water and alcohol,
(c) the coloring agent (a) and the vehicle (b) being mixed or kneaded together.

5 Claims, No Drawings

TEXTILE PRINTING PROCESS

This application is a continuation of application Ser. No. 08/031,021, filed Mar. 11, 1993, and now abandoned, which was a continuation of application Ser. No. 07/899,150, filed Jun. 17, 1992, and now abandoned, which was a continuation of application Ser. No. 07/662,509, filed Feb. 28, 1991, and now abandoned, which was a continuation of application Ser. No. 07/420,747, filed Oct. 13, 1989, and now abandoned, which was a continuation of application Ser. No. 07/245,954, filed Sep. 15, 1988, and now abandoned, which was a continuation of Ser. No. 06/927,976 filed Nov. 7, 1986, and now abandoned.

The present invention relates to a textile printing process.

Conventional textile printing processes include, besides roll printing and silk screen printing, genuine dry transfer printing as disclosed, for example, in British Patent No. 647,105, wet transfer printing as disclosed, for example, in U.S. Pat. Nos. 2,583,286 and 1,954,451, and photosensitive printing as disclosed, for example, in U.S. Pat. Nos. 2,541,178, 2,623,821 and 2,756,144. These conventional processes individually have the following serious drawbacks.

With the roll printing and silk screen printing processes wherein a roll or silk screen is used, it is almost impossible to reproduce delicate graphic patterns or designs. Moreover, the aftertreatment including steaming, soaping and rinsing involves great losses of the dye and is liable to stain the fabric and entail water pollution.

Although delicate graphic patterns or designs can be reproduced by genuine dry transfer printing, this process is applicable only to polyester, acetate and like synthetic fibers and is not usable for natural fibers. Additionally, even if the process is employed for synthetic fibers, the printed fabric has a poor texture and is likely to show unprinted portions when stretched.

Wet transfer printing is not limited in the kind of printable fabrics, but gravure printing must be resorted to when delicate patterns or designs are to be reproduced. The process is therefore very uneconomical and unsuited to industrial operation when a wide variety of prints are to be produced in small lots.

Although the photosensitive printing process is free of these drawbacks, this process includes many manual procedures, is complex and fails to produce prints rapidly and easily.

The main object of the present invention is to provide a textile printing process which is free of the drawbacks of the conventional processes.

More specifically, an object of the present invention is to provide a printing process by which delicate and graphic patterns or designs can be printed on a wide variety of fabrics of either natural fibers or synthetic fibers.

Another object of the invention is to provide a printing process in which the aftertreatment can be conducted with a reduced loss of the dye and without staining the fabric or entailing water pollution.

Another object of the invention is to provide a printing process suitable for preparing various kinds of prints in small batches.

These objects and other features of the present invention will become apparent from the following description.

The above objects of the present invention can be achieved by a printing process wherein the surface of a fabric is subjected to lithography or relief printing and subsequently to aftertreatment including steaming, soaping and rinsing and which is characterized in that the process employs an ink comprising:
 (a) a coloring agent comprising a dye or prepared by rendering a dye insoluble and/or oleophilic, and
 (b) a vehicle comprising
  (I) a lithographic oily varnish and/or
  (II) a glycol varnish and/or an amino alcohol varnish containing at least one of hydrotroping agent, neutral sodium salt, surfactant, basic material, water and alcohol,
 (c) the coloring agent (a) and the vehicle (b) being mixed or kneaded together.

We have conducted continued research on textile printing processes. In the course of the research, we have succeeded in developing a novel ink which has never been used for textile printing and found that the desired object can be fulfilled by using the ink for printing fabrics lithographically or typographically. During research further conducted based on this finding, we have further found that when the novel ink is used in combination with a specific coating agent, prints of more vivid color can be obtained with an increased color density. Thus, the present invention has been accomplished.

In principle, the inks to be used for the process of the invention are those comprising at least one coloring agent and at least one of the vehicles mentioned above, except for those comprising a dye itself serving as the coloring agent and a lithographic oily varnish serving as the sole vehicle. To explain this in detail, given below are the combinations of coloring agent and vehicle to be used for the process of the invention.

| No. | Coloring agent | Vehicle component(s) |
| --- | --- | --- |
| 1 | Dye as it is | At least one of glycol varnish and amino alcohol varnish |
| 2 | Dye as it is | Mixture of No. 1 vehicle and lithographic oily varnish |
| 3 | Dye made insoluble or oleophilic | At least one of glycol varnish, amino alcohol varnish and lithographic oily varnish |
| 4 | Mixture of No. 1 and No. 3 coloring agents | No. 3 vehicle |

When required, at least two of these inks can be used in admixture.

The coloring agent to be used in the present invention comprises a dye as it is or a dye as made insoluble and/or oleophilic. When classified, useful coloring agents are (a) water-soluble dye which is to be used as it is, (b) water-soluble dye as made insoluble and/oleophilic, (c) water-insoluble dye which is to be used as it is, and (d) combination of at least two of the coloring agents (a) to (c).

Examples of useful water-soluble dyes are various direct dyes, reactive dyes, acid dyes, metal-containing acid dyes, basic dyes, etc.

Examples of useful water-insoluble dyes are disperse dyes, vat dyes and various other water-insoluble dyes.

The treatment for making such dyes, preferably water-insoluble dyes, water-insoluble is not specifically limited insofar as the dye can be rendered water-insoluble. Typical methods of treatment are, for example, as follows.

(i) Conversion of the dye to an insoluble salt with a metal salt or by chelation.
(ii) Conversion of the dye to an insoluble amine salt.
(iii) Physical adsorption of the dye by an adsorbing agent.
(iv) Agglomeration of the dye.
(v) Combination of these methods.

These methods will be described in detail.

By the method (i), the dye is rendered water-insoluble by being converted to a metal salt or by chelation. Examples of metal compounds useful for this method are preferably inorganic metal compounds such as halides or sulfonates, for example, of Na, Fe, Ca, Al and like metals, and oxides of Si, Ti and the like. Further a wide variety of chelating agents capable of chelating dyes are usable for this method. The insolubilization conditions are not limited specifically; suitable conditions may be selected under which a metal salt or chelate can be obtained.

To practice the method (ii) of converting the water-soluble dye to an insoluble amine salt, usually a nitrogen-containing organic compound, as dissolved in a water-soluble organic solvent when so required, is admixed with an aqueous solution of the dye at room temperature or higher temperature. For this method, any solvent is usable insofar as it is a water-soluble organic solvent. For example, various alcohols are usable. The mixture is then filtered, washed and dried to obtain an insoluble product.

The nitrogen-containing organic compounds to be used for rendering the water-soluble dye water-insoluble include not only aliphatic compounds but also aromatic compounds. Typical examples of useful aliphatic compounds are amines and amides, these amines including primary, secondary and tertiary amines such as 1-aminododecane, N-tetradecylamine, palmitylamine, stearylamine and like alkylamines. Examples of useful amides are various fatty acid amides such as oleic amide, ricinoleic acid amide, stearic acid amide, etc. Examples of useful aromatic compounds are various aromatic amines and amides including phenylenediamine and diphenylguanidine. Of these compounds, preferable are 1-aminododecane, o-phenylenediamine and oleic amide.

The method (iii) of using an adsorbing agent or the agglomeration method (iv) are conducted advantageously, for example, by utilizing the adsorbing ability of a porous adsorbent substance such as zirconium complex, carbon black, active carbon, graphite, gamma-alumina or the like, or by utilizing the cohesive force, for example, of the condensation product of benzaldehyde and a polyhydric alcohol.

The water-insolubilization treatment is conducted by suitable one of these methods selected according to the kind of dye to be used and the printing conditions.

According to the present invention, the treatment for rendering the dye oleophilic (oleophilic treatment) is conducted instead of the water-insolubilization treatment, or in combination therewith. In the case of combination, the water-insolubilization treatment may precede the oleophilic treatment, or the oleophilic treatment may be followed by the insolubilization treatment. The oleophilic treatment can be conducted, for example, by treating the dye with a metal compound. This method of using the metal compound is the same as the insolubilization method (i) of converting the dye to a metal salt. In other words, the method (i) can be said to effect the oleophilic treatment simultaneously with water-insolubilization.

The vehicles to be used for the present invention include oily varnishes for lithography, and glycol varnishes or amino alcohol varnishes containing at least one of the components specified above.

The lithographic oily varnishes to be used in this invention can be a wide variety of vehicles conventionally used for lithographic inks, such as rosin, rosin-modified phenol, alkyl resin, oil-soluble acrylic resin and petroleum resin. Also usable are varnishes free from resin and consisting only of a natural drying vegetable oil such as tung oil or linseed oil, or synthetic drying oil.

The ink of the present invention may contain various other additives which are usually used for lithographic inks. Examples of such additives are thickener, gelation agent, drier, reducer, anti-offset agent, silicone varnish, silicone oil, etc.

The glycol varnish to be used in the present invention can be any of those heretofore used as such. Typical of such varnishes are those containing a main component which is prepared from an alochol-soluble and water-insoluble resin by dissoving the resin in a polyhydric alcohol and subjecting a portion of whole of the solution to an esterification reaction. More specific examples are steamset varnish and moisture set varnish. Examples of useful polyhydric alcohols are glycols, and mixtures of glycols and other polyhydric alcohols such as glycerin. Preferred resins are those insoluble in water and soluble in alcohols.

Further according to the present invention, also usable as the resin component of the conventional glycol varnish is a modified glycol varnish comprising a water-insoluble and alcohol-soluble resin as a portion of its resin component or as the sole resin component.

The amino alcohol varnish to be used as another component of the vehicle in this invention is a varnish obtained by substituting an amino alcohol for a portion or the whole of the polyhydric alcohol contained in the conventional glycol varnish or modified glycol varnish. Various amino alcohols are usable for this purpose.

The resins usable for such glycol (and modified glycol) varnishes and amino alconol varnishes are eventually those soluble in a wide variety of alcohols including not only monohydric alcohols but also polyhydric alcohols and amino alcohols. Examples of such resins are acid-modified rosin resins, preferably dibasic acid-modified rosin resins including rosin-modified maleic acid resin, rosin-modified fumaric acid resin, etc. Also useful are adducts of rosin and acids, especially dibasic acids, such as adduct of rosin and maleic acid (or maleic anhydride) and adduct of rosin and fumaric acid (or fumaric anhydride). Thus, adducts obtained by the Diels-Alder condensation reaction of rosin and these acids or acid anhydrides, especially dibasic acids, are desirable. In addition to these semi-synthetic resins, natural shellac and the like are usable. The most desirable of these resins are rosin-modified maleic acid resin having a high acid value.

Further usable according to the invention are novolak phenolic resins, especially glycol-soluble novolak phenolic resins having a low acid value of about 100.

The resins exemplified above are those insoluble in water and soluble in alcohols. Besides these, also usable are hydroxyalkylcellulose and polyvinylpyrrolidone which are soluble in water and alcohols.

It is required that these glycol varnishes or amino alcohol varnishes contain at least one of hydrotroping agent, neutral sodium salt, surfactant, basic material, water and alcohol. These components will be described below.

Examples of useful hydrotroping agents are those capable of solubilizing dyes and including polyhydric alcohols such as diethylene glycol, thiodiethylene glycol, dipropylene glycol, propylene glycol, ethylene glycol, hexylene glycol, polyethylene glycol and glycerin, amino alcohols such as mono-, di- and tri-ethanolamines, acetin or glycerol acetate, ethers such as diethylene glycol monoethyl ether and triglycol ethyl ether, urea, etc. Such agents are also termed dye dissolving agents. Of these, the most preferable to use in this invention are diethylene glycol and urea.

Useful surfactants include cationic, anionic and non-ionic surfactants. Especially desirable are anionic surfactants such as sodium stearate, sodium lauryl sulfate and sodium alkylbenzenesulfonate. Examples of useful basic materials are morpholine, ammonia, KOH, NaOH, sodium bicarbonate, sodium carbonate, water glass, etc. The term "sodium salt" refers to a neutral salt such as anhydrous Glauber's salt or crystalline sodium sulfate ($Na_2SO_4.10H_2O$) or the like. Such a salt, when used in combination with the basic material, acts as an alkali solubilizing auxiliary agent to improve the dyeing ability especially of reactive dyes.

The alcohol to be used is a monohydric alcohol having a low boiling point, which is typically methanol, ethanol, isopropyl alcohol or the like. When the process of the present invention is conducted by flexo printing, a large quantity of such a low-boiling alcohol, if contained in the ink, gives the ink a greatly reduced viscosity and a higher drying speed, assuring satisfactory flexo-printability.

At least one of the above substances is used usually in an amount of 1 to 2000 parts by weight, preferably about 5 to about 1000 parts by weight, per 100 parts by weight of the resin component.

According to the present invention, the foregoing components are formulated into an ink by the usual method.

The ink thus obtained is applied to the surface of fabrics by lithography or relief printing. The fabrics to be used are those made of synthetic fibers and also natural fibers. Examples of synthetic fibers are nylon, polyester, acrylic and various other synthetic fibers. Examples of natural fibers are cotton, silk, hemp, wool and like fibers. Lithography can be conducted by direct method or offset printing. Relief printing can be conducted in the usual manner.

The printed fabric is dried after coating or without coating. Preferably, the fabric is dried completely or until it becomes dry to the touch. The fabric is thereafter steamed, soaped and rinsed by usual methods.

Another distinct feature of the present invention is that the above printing procedure is executed in combination with the application of a coating agent when so required. The coating agent consists essentially of the varnish (b), (II).

The conjoint use of the coating agent provides prints of vivid color with a very high color density. While relief printing can of course be resorted to, use of the coating agent permits lithography although the agent is aqueous. This means that there is no need to additionally prepare a coating machine but the fabric can be printed completely by a single process using a lithographic or typographic multicolor printing machine, hence a very high efficiency and great economy. Further because the coating agent is aqueous, the printing machine used can be thereafter cleaned with use of water. This also assures a high efficiency and sanitation.

When the ink is used for printing, the coating agent is applied to the fabric as an undercoat, or as an overcoat after printing. Furthermore, the undercoat is usable in combination with the overcoat. In this case, two different coating agents are usable, or the coating agent may be applied twice to obtain a coating of increased thickness. In any way, the coating agent is applied suitably according to the number of colors of inks and the unit number of printing machines.

When it is desired to print a particular color with an increased color density when multicolor printing is resorted to according to the invention, the coating agent can be applied only to the areas to which the ink of the particular color is to be applied.

All the foregoing drawbacks of the conventional printing processes can be overcome by the process of the present invention. Thus, the present process has the following advantages.

(a) Like color photography, the process reproduces delicate patterns or designs.
(b) Various prints can be produced in small batches economically, rapidly, easily and simply.
(c) The process is applicable to fabrics of any kind made of various synthetic fibers, as well as various natural fibers.
(d) The process is almost free of objections such as water pollution, staining and losses of dyes.
(e) The printed fabrics obtained are excellent in texture and various kinds of fastness and are free from unprinted spots which would otherwise be found when the print is stretched.
(f) Use of the coating agent conjointly with the present ink affords prints of vivid color with an increased color density.

The present invention will be described with reference to the following examples, in which the numerical values indicating the proportions of the components are all by weight unless otherwise specified.

The inks and the coating agents of the compositions given in the following examples are all prepared by kneading using a three-roll mill unless otherwise stated.

EXAMPLE 1

Compositions of Inks

TABLE 1

| Components | Yellow ink | Red ink | Black ink |
| --- | --- | --- | --- |
| Chrysophenine G (C.I. Direct Yellow 12, Sumitomo Chemical Co., Ltd.) | 1 | | |
| Nippon Fast Red B B conc (C.I. Direct Red 31, Sumitomo Chemical Co., Ltd.) | | 1 | |
| Japanol Fast Black D conc (C.I. Direct Black 154, Sumitomo Chemical Co., Ltd.) | | | 1 |
| Glycol varnish (Godo Printing Ink Mfg. Co., Ltd.) | 3 | 3 | 3 |
| Newrex R (sodium alkylbenzenesulfonate, Nippon Oils & Fats Co., Ltd.) | 3 | 3 | 3 |
| 50% NaOH solution | 3 | 3 | 3 |
| Composition of coating agent | | | |
| Glycol varnish (Godo Printing Ink Mfg. Co., Ltd.) | | | 30 |
| Sodium stearate | | | 9 |
| Sodium lauryl sulfate | | | 3 |

TABLE 1-continued

| Components | Yellow ink | Red ink | Black ink |
|---|---|---|---|
| Diethylene glycol | | | 1.5 |

Printing

A graphic delicate pattern was printed on fabrics of cotton, hemp or nylon with yellow, red and black inks each containing the above direct dye, using a relief (heliotype) printing press. At the same time, the coating composition of the above composition was also applied as an overcoat by the same machine. After the inks and the coating agent dried, the fabrics were steamed, soaped and rinsed by usual methods for aftertreatment, whereby prints of good fastness and texture were obtained with high color densities.

EXAMPLE 2

Compositions of Inks

TABLE 2

| Components | Yellow ink | Red ink | Blue ink | Black ink |
|---|---|---|---|---|
| Basilen Brilliant Yellow P-3GN (C.I. Reactive Yellow-2, BASF) | 4 | | | |
| Sumifix Red B (C.I. Reactive Red, Sumitomo Chemical Co., Ltd.) | | 4 | | |
| Basilen Turguoise Blue P-GR (C.I. Reactive Blue 72, BASF) | | | 4 | |
| Basilen Black DBR (C.I. Reactive Black, BASF) | | | | 4 |
| Glycol varnish (Godo Printing Ink Mfg. Co., Ltd.) | 13 | 13 | 13 | 13 |
| Sodium stearate | 1.5 | 1.5 | 1.5 | 1.5 |
| Sodium lauryl sulfate | 0.5 | 0.5 | 0.5 | 0.5 |
| Diethylene glycol | 5 | 5 | 5 | 5 |
| Composition of coating agent | | | | |
| Glycol varnish (Godo Printing Ink Mfg. Co., Ltd.) | | | | 23 |
| Sodium stearate | | | | 4.5 |
| Sodium lauryl sulfate | | | | 1.5 |
| Diethylene glycol | | | | 3 |
| Newrex R (sodium alkyl-benzenesulfonate, Nippon Oils & Fats Co., Ltd.) | | | | 8 |
| 50% NaOH solution | | | | 8 |

Printing

A color photographic image of pattern was printed on a cotton fabric with yellow, red, blue and black inks each containing the above reactive dye, using a relief (heliotype) printing press. The coating agent was thereafter applied to the entire surface of the fabric as an overcoat by the same machine. After the inks and the coating agent dried, the fabric was steamed, soaped and rinsed by usual methods for aftertreatment. The pattern of the original color photographic image was reproduced with high fidelity on the print thus obtained, which was satisfactory in fastness and texture.

EXAMPLE 3

Compositions of Inks

TABLE 3

| Components | Yellow ink | Red ink | Blue ink | Black ink |
|---|---|---|---|---|
| Lanyl Yellow GS 143% (C.I. Acid Yellow 161, Sumitomo Chemical Co., Ltd.) | 5 | | | |
| Irgalan Red 2GL 200% cws (C.I. Acid Red 211, CIBA-Geigy) | | 5 | | |
| Lanyl Brilliant Blue BGL (C.I. Acid Blue 338, Sumitomo Chemical Co., Ltd.) | | | 5 | |
| Irgalan Black BGL 200% (C.I. Acid Black 107, CIBA-Geigy) | | | | 5 |
| Glycol varnish (Godo Printing Ink Mfg. Co., Ltd.) | 13 | 13 | 13 | 13 |
| Sodium stearate | 1.5 | 1.5 | 1.5 | 1.5 |
| Sodium lauryl sulfate | 0.5 | 0.5 | 0.5 | 0.5 |
| Diethylene glycol | 5 | 5 | 5 | 5 |

Composition of Coating Agent

The same as the one used in Example 2.

Printing

A color photographic image of pattern was printed on a wool fabric with four inks each containing the above metal-containing acid dye, using a relief (heliotype) printing press. The coating agent was applied to the entire printed surface as an overcoat. After the inks and the coating agent dried, the fabric was steamed, soaped and rinsed by usual methods for aftertreatment. The pattern of the original was reproduced with high fidelity and good fastness on the resulting print, which retained the texture of wool.

EXAMPLE 4

Composition of Ink

A red ink of the same composition as in Example 3 was prepared with the exception of using Polar Brilliant Red B 125% (C.I. Acid Red 249, CIBA-Geigy) as an acid dye.

Composition of Coating Agent

The same as in Examples 2 and 3.

Printing

The above ink was applied to fabrics of wool or nylon by a relief printing process. The coating agent was applied only to one half of each print as an overcoat, with the other half left uncoated. After the ink and the coating agent dried, the fabrics were steamed, soaped and rinsed. While the prints thus obtained had a vivid dark red color, the coated area exhibited a more vivid color in the case of the wool fabric, whereas the uncoated area of the nylon fabric had more vivid color than the other area thereof.

EXAMPLE 5

Composition of Ink

A yellow ink of the same composition as in Example 3 was prepared with the exception of using Diacryl Yellow 3G-N (basic dye, Mitsubishi Chemical Industries, Ltd.).

The yellow ink was applied to an acrylic fabric by a relief printing press. After the ink dried, the fabric was steamed, soaped and rinsed for aftertreatment in the usual manner. The print thus obtained exhibited a brilliant yellow color resembling a fluorescent color and peculiar to the basic dye.

EXAMPLE 6

| Composition of ink | |
|---|---|
| Chrysophenine G (C.I. Direct Yellow 12, Sumitomo Chemical Co., Ltd.) | 2 |
| Glycol varnish (Godo Printing Ink Mfg. Co., Ltd.) | 8 |
| Diethylene glycol | 1 |

Printing

A graphic pattern was printed on a cotton fabric and rayon fabric with the yellow ink of the above composition containing the direct dye, using a relief printing press. After the ink dried, the fabrics were steamed, soaped and rinsed by usual methods for aftertreatment. The prints obtained had a dark brilliant orange color.

EXAMPLE 7

Compositions of Inks

TABLE 4

| Components | Yellow ink | Red ink | Blue ink | Black ink |
|---|---|---|---|---|
| Chrisophenine G (C.I. Direct Yellow 12, Sumitomo Chemical Co., Ltd.). | 12 | | | |
| Nippon Fast Red B B conc (C.I. Direct Red 31, Sumitomo Chemical Co., Ltd.) | | 12 | | |
| Brilliant Fast Blue G conc (C.I. Direct Blue 86, Nankai Dyestuff Mfg. Co., Ltd.) | | | 12 | |
| Japanol Fast Black D conc (C.I. Direct Black 154, Sumitomo Chemical Co., Ltd.) | | | | 12 |
| Glycol varnish (Gogo Printing Ink Mfg. Co., Ltd.) | 26 | 26 | 26 | 26 |
| Sodium stearate | 3 | 3 | 3 | 3 |
| Sodium laurylsulfate | 1 | 1 | 1 | 1 |
| Urea | 8 | 8 | 8 | 8 |
| Diethylene glycol | 10 | 10 | 10 | 10 |
| Composition of coating agent | | | | |
| Glycol varnish (Godo Printing Ink Mfg. Co., Ltd. | | | | 15 |
| Sodium stearate | | | | 4.5 |
| Sodium laurylsulfate | | | | 1.5 |
| Diethylene glycol | | | | 7 |
| 50% NaOH solution | | | | 8 |

Printing

A color photographic pattern was printed on fabrics with four inks each containing the direct dye listed above, using a lithographic printing press provided with dry offsetting means (relief plate). At the same time, the coating agent was applied to the fabrics by the same machine.

The fabrics used were made of cotton or rayon. The coating agent was not applied to some areas of the fabric of each material.

After the inks and the coating agent dried, the fabrics were steamed, soaped and rinsed for aftertreatment. In the case of the cotton fabric, the print exhibited higher color densities in the overcoated areas than in the other area, but from the viewpoint of the balance of the four colors, the color photographic pattern was reproduced with higher fidelity in the area having no overcoat.

In the case of the rayon fabric, each color had a satisfactory density in non-coated area, while the print exhibited higher color desities and better color balance in the overcoated areas.

EXAMPLE 8

Compositions of Inks

TABLE 5

| Components | Yellow ink | Red ink | Blue ink | Black ink |
|---|---|---|---|---|
| Sumilight Supra Yellow BC conc (C.I. Direct Yellow 28, Sumitomo Chemical Co., Ltd.) | 12 | | | |
| Sumilight Supra Red 4BL 170% (C.I. Direct Red 79, Sumitomo Chemical Co, Ltd.) | | 12 | | |
| Brilliant Fast Blue G conc (C.I. Direct Blue 86, Nankai Dyestuff Mfg. Co., Ltd.) | | | 12 | |
| Japanol Fast Black D conc (C.I. Direct Black 154, Sumitomo Chemical Co., Ltd.) | | | | 12 |
| Glycol varnish (Godo Printing Ink Mfg. Co., Ltd.) | 26 | 26 | 26 | 26 |
| Sodium stearate | 3 | 3 | 3 | 3 |
| Sodium lauryl sulfate | 1 | 1 | 1 | 1 |
| Urea | 8 | 8 | 8 | 8 |
| Diethylene glycol | 10 | 10 | 10 | 10 |

A color photographic pattern was printed on a cotton fabric with four inks each containing the above direct dye, using a relief (heliotype) printing press. At the same time, the fabric was overcoated with a coating agent which was a triethanolamine solution of a rosin modified maleic acid resin (amino alcohol varnish, product of Godo Printing Ink Mfg. Co., Ltd.) using the same machine.

After the inks and the coating agent dried, the fabric was steamed, soaped and rinsed for aftertreatment.

The print thus obtained had high color densities and exhibited brilliant colors with good balance.

EXAMPLE 9

Compositions of Inks

TABLE 6

| Components | Yellow ink | Black ink |
|---|---|---|
| Mixture | | |
| Chrysophenine G (C.I. Direct Yellow 12, Sumitomo Chemical Co., Ltd.) | 12 | |
| Nippon Fast Red B B conc (C.I. Direct Red 31, Sumitomo Chemical Co., Ltd.) | | 12 |
| Glycol varnish (Godo Printing Ink Mfg. Co., Ltd.) | 30 | 96 |
| Sodium stearate | 9 | 9 |
| Sodium lauryl sulfate | 3 | 3 |
| Diethylene glycol | 6 | 6 |
| Solvent | | |
| Ethanol | 66 | |
| Isopropyl alcohol | | 66 |

Each mixture listed above was kneaded by a three-roll mill into a viscous paste, to which the above solvent was added to prepare an ink of low viscosity.

Printing

Using the yellow ink and the red ink thus prepared, a two-color graphic pattern was printed on a cotton fabric and a nylon fabric by a flexo printing press.

The fabrics were steamed, soaped and rinsed for after treatment in the usual manner. Each print exhibited the same delicate pattern on both front and rear surfaces and was suited for use as a flag or banner for publicity.

EXAMPLE 10

A. Insolubilization (oleophilic treatment) of dyes

TABLE 7

| Materials | Treated product Red | Treated product Yellow |
|---|---|---|
| First mixture | | |
| Benzopurpurine 4B (C.I. Direct Red 12, Sumitomo Chemical Co., Ltd.) | 2 | |
| Chrysophenine G (C.I. Direct Yellow 12, Sumitomo Chemical Co., Ltd.) | | 2 |
| Anhydrous $BaCl_2$ | 20 | 20 |
| Hot water | 80 | 80 |
| Second mixture | | |
| Soxinol D (diphenylguanidine, Sumitomo Chemical Co., Ltd.) | 5 | 5 |
| Ethanol | 10 | 10 |
| Hydrochloric acid | 2 | 2 |

The first mixture and the second mixture listed above were mixed together and reacted with stirring, followed by filtration, washing and drying to obtain red and yellow insolubilized (oleophilic) dyes.

B. Preparation of inks

Two kinds of inks, red and yellow, were prepared from the following components using a three-roll mill for kneading.

| | |
|---|---|
| Insolubilized (oleophilic) dye obtained as above | 1 |
| Ultra-gloss medium (Dainippon Ink & Chemicals, Inc.) | 1 |
| Linseed oil varnish | 0.2 |
| GOGAI-varnish (Mitsubishi Ink) | 0.1 |
| C. Preparation of coating agent | |
| Glycol varnish (Godo Printing Ink Mfg. Co., Ltd. | 5 |
| Sodium hydrogencarbonate | 2 |
| Sodium carbonate | 1 |

A coating agent was prepared from the above components using a three-roll mill for kneading.

Printing

A red and yellow photographic pattern was printed on a cotton fabric with the inks prepared by the procesure B, using a lithographic (direct) printing press. Subsequently, the fabric was overcoated with the coating agent C by the same machine. After the inks and the coating agent dried, the fabric was steamed, soaped and rinsed for aftertreatment to obtain a print of vivid colors with good fastness and high color densities.

EXAMPLE 11

A. Insolubilization (oleophilic treatment) of dyes and preparation of inks

TABLE 8

| Materials | Insolubilized dyes Yellow | Red | Blue | Black |
|---|---|---|---|---|
| First mixture | | | | |
| Sumilight Supra Yellow BC conc (C.I. Direct Yellow 28, Sumitomo Chemical Co., Ltd.) | 2 | | | |
| Sumilight Supra Red 4BL 170% (C.I. Direct Red 79, Sumitomo Chemical Co., Ltd.) | | 2 | | |
| Brilliant Fast Blue G conc (C.I. Direct Blue 86, Nankai Dyestuff Mfg. Co., Ltd.) | | | 2 | |
| Direct Fast Black B 160% (C.I. Direct Black 22, Sumitomo Chemical Co., Ltd.) | | | | 2 |
| Anhydrous sodium sulfate | 10 | 10 | 10 | 10 |
| Common salt | 8 | 8 | 8 | 8 |
| Silicic acid | | 2.4 | | 2.4 |
| $TiO_2$ (titanium dioxide) | 4.8 | | 4.8 | |
| Anhydrous barium chloride | 16 | 16 | 16 | 16 |
| Hot water | 160 | 160 | 160 | 160 |
| Second mixture | | | | |
| Soxinol D (diphenylguanidine, Sumitomo Chemical Co., Ltd.) | | 5 | 5 | |
| Ethanol | | 10 | | |
| Methanol | | | 10 | |
| Hydrochloric acid | | 3 | 3 | |

Although the dyes can be fully insolubilized when the formulations of Table 8 are used without using the second mixture, the red and blue dyes, when treated with the second mixture as admixed with the first, exhibited futher improved water resistance (fountain solution fastness). The insolubilization treatment was conducted in the same manner as in Example 10.

Inks were prepared according to the same formulations and in the same manner as in Example 10 using the four insolubilized (oleophilic) dyes thus obtained.

B. Printing

A four-color photographic pattern was printed on a cotton fabric with the four kinds of inks using a lithographic offset printing press.

C. Preparation of coating agents

Four kinds of coating agents were prepared from the following components in the same manner as in Example 10.

TABLE 9

| Components | Coating agents 1 | 2 | 3 | 4 |
|---|---|---|---|---|
| Glycol varnish (Godo Printing Ink Mfg. Co., Ltd. | 5 | 5 | 5 | 5 |
| Sodium hydrogencarbonate | 3 | 3 | 3 | 3 |
| Sodium carbonate | 2 | 2 | 2 | 2 |
| Blapan NF (nonionic surfactant, Aoki Oil Industrial Co., Ltd.) | | 1 | | 1 |
| Triethanolamine | 1 | | 1 | |
| 50% NaOH solution | | | | 2 |

Four pieces of the printed cotton fabric were overcoated with the four kinds of coating agents, respectively, over the pattern to obtain four prints which were different in the coating agent applied. The prints were steamed, soaped and rinsed for aftertreatment. The prints were colorful and had high color densities.

EXAMPLE 12

A. Insolubilization (oleophilic treatment) of dye

An insolubilized dye was prepared in the same manner as in Examples 10 and 11 according to the following formulation.

| First mixture | |
|---|---|
| Diphenyl Brilliant Pink B 145% (C.I. Direct Red 9, CIBA-Geigy) | 2 |
| Anhydrous sodium sulfate | 1 |
| Common salt | 1 |
| Silicic acid | 3 |
| Anhydrous $BaCl_2$ | 20 |
| Hot water | 50 |

-continued

| Second mixture | |
|---|---|
| Soxinol D (diphenylguanidine, Sumitomo Chemical Co., Ltd.) | 5 |
| Ethanol | 10 |
| Hydrochloric acid | 3 |

B. An ink was prepared according to the same formulation and in the same manner as in Examples 10 and 11 using the above insolubilized dye.

C. Printing

A graphic design was printed on a cotton fabric by lithographic offset printing using the ink prepared as above.

D. Preparation of coating agents

TABLE 10

| Components | Coating agents | | | |
|---|---|---|---|---|
| | 1 | 2 | 3 | 4 |
| Glycol varnish (Godo Printing Ink Mfg. Co., Ltd.) | 5 | 5 | 5 | 5 |
| Sodium bicarbonate | 3 | 3 | 3 | 3 |
| Sodium carbonate | 2 | 2 | 2 | 2 |
| Castor wax (nonionic surfactant, Aoki Oil Industrial Co., Ltd.) | 1 | | 1 | |
| Blapan NF (do) | | 1 | | 1 |
| Triethanolamine | | 1 | 1 | |

Four kinds of coating agents were prepared according to the above formulations in the same manner as in Examples 10 and 11 and were applied to four pieces of the printed cotton fabric over the pink design by a lithographic offset printing press. The fabric was dried and thereafter steamed, soaped and rinsed for aftertreatment to obtain prints, which were fast and had a vivid pink color with a high density.

EXAMPLE 13

The following reactive dyes were insolubilized exactly in the same manner as in Examples 10 to 12.

TABLE 11

| Materials | Insolubilize | | | | | |
|---|---|---|---|---|---|---|
| | Red | Red | Red | Yellow | Black | Red |
| First mixture | | | | | | |
| Sumifix Red B (C.I. Reactive Red 22, Sumitomo Chemical Co., Ltd.) | 2 | 2 | 2 | | | |
| Sumifix Yellow GRS (C.I. Reactive Yellow 116, Sumitomo Chemical Co., Ltd.) | | | | 2 | | |
| Sumifix Black B (C.I. Reactive Black 5, Sumitomo Chemical Co., Ltd.) | | | | | 2 | |
| Diamira Brilliant Red BB (C.I. Reactive Red 21, Mitsubishi Chemical Industries, Ltd.) | | | | | | 2 |
| Anhydrous sodium sulfate | 5 | | | | | |
| Common salt | 5 | | | | | |
| Silicic acid | 3 | | | | | |
| Anhydrous BaCl$_2$ | 20 | 20 | 20 | 20 | 20 | 20 |
| Hot water | 180 | 100 | 120 | 120 | 120 | 80 |
| Second mixture | | | | | | |
| Soxinol D (diphenylguanidine, Sumitomo Chemical Co., Ltd.) | | 5 | 5 | 5 | 5 | |
| Ethanol | | 10 | 10 | 10 | 10 | |
| Hydrochloric acid | | | 3 | 3 | 3 | 2 |

Six kinds of inks were prepared according to the same formulation and in the same manner as in Examples 10 to 12 using the six kinds of insolubilized (oleophilic) dyes prepared above.

A coating agent was prepared from the following components.

| Glycol varnish (Godo Printing Ink Mfg. Co., Ltd.) | 10 |
|---|---|
| Sodium stearate | 3 |
| Sodium lauryl sulfate | 1 |
| Sodium bicarbonate | 3 |
| Na$_2$SO$_4$.10H$_2$O | 3 |
| 50% NaOH solution | 6 |

The six kinds of inks were applied to a cotton fabric by lithographic offset printing machine, and the fabric was further overcoated with the coating agent by the same machine. After the inks and the agent dried, the fabric was steamed, soaped and rinsed for aftertreatment. The print obtained had vivid colors with high color densities and high fastness. Since the reactive dyes were used, the print exhibited outstanding color fastness to washing.

EXAMPLE 14

A. The dye listed below was insolubilized and thereby made oleophilic according to the following formulation. The first and second mixtures listed were handled in the same manner as in Examples 10 to 13.

TABLE 12

| Materials | Insolubilized dyes | | |
|---|---|---|---|
| | 14-1 | 14-2 | 14-3 |
| First mixture | | | |
| Sumilight Supra Blue 3GS (C.I. Direct Blue 202, Sumitomo Chemical Co., Ltd.) | 2 | 2 | 2 |
| Anhydrous sodium sulfate | 5 | 5 | 5 |
| Common salt | 5 | 5 | 5 |
| Anhydrous BaCl$_2$ | 20 | 20 | 20 |
| Hot water | 200 | 200 | 200 |
| Second mixture | | | |
| Stearylamine | 5 | | |
| o-Phenylenediamine | | 5 | |
| Oleic amide | | | 5 |
| Ethanol | 40 | 40 | 20 |
| Hydrochloric acid | 7 | 7 | 7 |

B. Three kinds of inks were prepared from these three kinds of blue dyes insolubilized under different conditions. The formulation and the method of preparation were the same as in Examples 10 to 13.

C. Preparation of coating agent

| | |
|---|---|
| Glycol varnish (Godo Printing Ink Mfg. Co., Ltd.) | 10 |
| Sodium stearate | 3 |
| Sodium lauryl sulfate | 1 |

A coating agent was prepared from the above components using a three-roll mill for kneading.

D. Printing and aftertreatment

The three kinds of blue inks were applied to two kinds of fabrics, cotton or hemp, by lithographic offset printing. The fabrics were overcoated with the above coating agent, dried and thereafter steamed, soaped and rinsed for aftertreatment, whereby yellowish blue beautiful printed fabrics of cotton or hemp were obtained.

EXAMPLE 15

TABLE 13

| | Insolubilized dyes | | |
|---|---|---|---|
| Materials | 15-1 | 15-2 | 15-3 |
| First mixture | | | |
| Polar Brilliant Red B 125% (C.I. Acid Red 249, CIBA-Geigy) | 2 | 2 | 2 |
| Anhydrous BaCl$_2$ | 20 | 20 | 20 |
| Hot water | 100 | 160 | 160 |
| Second mixture | | | |
| Soxinol D (diphenylguanidine, Sumitomo Chemical Co., Ltd.) | 5 | | |
| Stearylamine | | 5 | |
| o-Phenylenediamine | | | 5 |
| Ethanol | 10 | 40 | 40 |
| Hydrochloric acid | 3 | 7 | 7 |

The acid dye listed above was treated according to the formulations given above. The first and second mixtures were handled in the same manner as in Examples 10 to 14.

Using three kinds of insolubilized (oleophilic) dyes 15-1 to 15-3, three kinds of red inks were prepared according to the same formulation and in the same manner as in Examples 10 to 14.

On the other hand, a coating agent was prepared from the following components using a three-roll mill for kneading.

| | |
|---|---|
| Glycol varnish (Godo Printing Ink Mfg. Co., Ltd. | 10 |
| Sodium stearate | 3 |
| Sodium lauryl sulfate | 1 |
| Sodium bicarbonate | 4 |
| Na$_2$SO$_4$ | 4 |
| Newrex R (sodium alkylbenzenesulfonate, Nippon Oils & Fats Co., Ltd.) | 14.8 |
| 50% NaOH solution | 8 |

Each of the three red inks was applied to fabrics of silk, nylon or wool by lithographic offset printing press, and the fabrics were overcoated with the coating agent by the same machine. After the ink and the coating agent dried, the fabrics were steamed, soaped and rinsed by usual methods for aftertreatment. The prints thus obtained using three kinds of fabrics and the three kinds of inks individually had a very vivid red graphic pattern formed on the surface.

EXAMPLE 16

Metal-containing acid dyes were insolubilized and thereby made oleophilic using the formulations listed below.

TABLE 14

| | Insolubilized dyes | | | |
|---|---|---|---|---|
| Materials | Yellow | Red | Blue | Black |
| First mixture | | | | |
| Lanyl Yellow GS 143% (C.I. Acid Yellow 161, Sumitomo Chemical Co., Ltd.) | 2 | | | |
| Irgaran Red 2GL 200% CWS (C.I. Acid Red 211, CIBA-Geigy) | | 2 | | |
| Lanyl Brilliant Blue BGL (C.I. Acid Blue 338, Sumitomo Chemical Co., Ltd.) | | | 2 | |
| Irgaran Black BGL 200% (C.I. Acid Black 107, CIBA-Geigy) | | | | 2 |
| Anhydrous sodium sulfate | 5 | 5 | 5 | 5 |
| Common salt | 5 | 5 | 5 | 5 |
| Anhydrous BaCl$_2$ | 20 | 20 | 20 | 20 |
| Hot water | 140 | 140 | 140 | 140 |
| Second mixture | | | | |
| Soxinol D (diphenylguanidine, Sumitomo Chemical Co., Ltd.) | 5 | 5 | 5 | 5 |
| Methanol | 10 | 10 | 10 | 10 |
| Hydrochloric acid | 3 | 3 | 3 | 3 |

The first mixture and the second mixture were treated in the same manner as in Examples 10 to 15.

According to the same formulation as in Examples 10 to 15, the above insolubilized dyes were made into four inks using a three-roll mill for kneading.

A landscape color photograph was printed on a wool fabric with these four kinds of inks using a lithographic offset printing press. The fabric was further overcoated with the same coating agent as used in Exm. 15 by the same machine. After drying, the fabric was steamed, soaped and rinsed for aftertreatment, affording a print having the photographic image reproduced thereon delicately.

EXAMPLE 17

The direct dyes listed below were insolubilized and thereby made oleophilic using the first mixture given in Table 15 and the second mixture stated below.

TABLE 15

| | Insolubilized dyes | | | |
|---|---|---|---|---|
| Materials | Yellow | Red | Blue | Black |
| First mixture | | | | |
| Chrysophenine G (C.I. Direct Yellow 12, Sumitomo Chemical Co., Ltd.) | 2 | | | |
| Nippon Fast Red BB conc (C.I. Direct Red 31, Sumitomo Chemical Co., Ltd.) | | 2 | | |
| Sumilight Supra Blue 3GS (C.I. Direct Blue 202, Sumitomo Chemical Co., Ltd.) | | | 1 | |
| Brilliant Fast Blue G conc (C.I. Direct Blue 86, Nankai Dyestuff Mfg. Co., Ltd.) | | | 1 | |
| Japanol Fast Black D conc (C.I. Direct Black 154, Sumitomo Chemical Co., Ltd.) | | | | 2 |
| Anhydrous sodium sulfate | 5 | 5 | 5 | 5 |
| Common salt | 5 | 5 | 3 | 5 |
| Silicic acid | | | 1.5 | |

TABLE 15-continued

| Materials | Insolubilized dyes | | | |
|---|---|---|---|---|
| | Yellow | Red | Blue | Black |
| Anhydrous BaCl$_2$ | 20 | 20 | 20 | 20 |
| Hot water | 150 | 180 | 150 | 150 |
| Second mixture | | | | |
| Soxinol D (diphenylguanidine, Sumitomo Chemical Co., Ltd.) | | | | 5 |
| Ethanol | | | | 10 |
| Hydrochloric acid | | | | 3 |

The first mixture containing each dye and the second mixture were mixed together and reacted with stirring, followed by filtration, washing and drying to obtain an insolubilized (oleophilic) dye.

The insolubilized dyes thus prepared were made into four kinds of inks according to the same formulation and in the same manner as in Examples 10 to 16. A photographic flower pattern was printed on a cotton fabric with these inks by a lithographic offset printing press. The fabric was further overcoated with the same coating agent as used in Example 14. After the inks and the agent dried, the fabric was steamed, soaped and rinsed for aftertreatment, giving a print of vivid colors with high color densities and outstanding fastness and texture.

EXAMPLE 18

The same result as achieved in Example 17 was obtained when the procedure of Example 17 was repeated with the exception of using the coating agents used in Examples 13 and 15, instead of the agent used in Example 17.

EXAMPLE 19

The same result as achieved in Examples 17 and 18 was achieved by undercoating a white cotton fabric with each of the coating agents used in Examples 17 and 18 and thereafter printing the fabric with the inks used in these examples.

EXAMPLE 20

The same result as achieved in Examples 17 to 19 was obtained by undercoating a white cotton fabric with each of the coating agents used in Examples 17 to 19, then printing the fabric with the inks used in these examples and thereafter overcoating the printed surface with the same coating agent to sandwich the ink layer.

EXAMPLE 21

The dye listed in Table 16 was insolubilized and thereby made oleophilic using the mixtures shown in the table.

TABLE 16

| First mixture | |
|---|---|
| Sumilight Supra Yellow BC conc (C.I. Direct Yellow 28, Sumitomo Chemical Co., Ltd.) | 2.5 |
| Hot water | 30 |
| Second mixture | |
| Soxinol D (diphenylguanidine, Sumitomo Chemical Co., Ltd.) | 5 |
| Ethanol | 10 |
| Hydrochloric acid | 3 |

The first and second mixtures were treated in the same manner as in Examples 10 to 20.

The treated dye was made into an ink according to the same formulation and in the same manner as in Examples 10 to 20. A graphic pattern was printed on a cotton fabric and a nylon fabric by a lithographic printing press using this ink and the coating agent used in Example 14. After drying, the fabrics were steamed, soaped and rinsed for aftertreatment, giving prints with the pattern reproduced thereon in yellow.

The same result was achieved irrespective of whether the coating agent was applied as an undercoat or overcoat or as both undercoat and overcoat to sandwich the ink layer.

EXAMPLE 22

A commercial pigment lake was formulated into an ink using the following components.

| Pink 6G-RP (basic pigment lake, Noma Chemical Ind. Co., Ltd.) | 1.2 |
|---|---|
| Ultra-gloss medium (Dainippon Ink & Chemicals, Inc.) | 1.8 |
| Linseed oil varnish | 0.4 |
| GOGAI varnish (do) | 0.2 |

These components were kneaded by a three-roll mill to obtain the ink.

A graphic pattern was printed on a cotton fabric and a nylon fabric by a lithographic offset printing press using the ink and the coating agent used in Example 14. The fabrics were thereafter steamed, soaped and rinsed for aftertreatment.

A distinct printed pattern was formed on both the cotton and nylon fabrics irrespective of whether the coating agent is applied as an undercoat or overcoat or as both.

EXAMPLE 23

A commercial (insolubilized) pigment lake, prepared by agglomerating a direct dye with a condensation product of benzaldehyde and a polyhydric alcohol, was formulated into an ink. More specifically, the following components were kneaded into an ink.

| Direct Black agglomerate (E.C. Chemical Ind. Co., Ltd.) | 0.6 |
|---|---|
| Ultra-gloss medium (Dainippon Ink & Chemicals, Inc.) | 1.4 |
| Linseed oil varnish | 0.4 |
| GOGAI varnish (do) | 0.1 |

A graphic pattern was printed on a cotton fabric and a hemp fabric by a lithographic offset printing press using this ink and the coating agent used in Example 14. The fabrics were dried and thereafter steamed, soaped and rinsed.

The pattern was formed in dark green on the fabrics irrespective of whether the coating agent was applied as an undercoat or overcoat or as both.

EXAMPLE 24

The direct dye listed in Table 17 was insolubilized and thereby made oleophilic using the mixtures shown in the same table. The first and second mixtures were treated in the same manner as in Examples 10 to 21.

TABLE 17

| First mixture | |
|---|---|
| Direct Fast Black B 160% (C.I. Direct Black 22, Sumitomo Chemical Co., Ltd.) | 2 |
| Aluminum sulfate.14-18H$_2$O | 5 |

TABLE 17-continued

| | |
|---|---|
| Anhydrous BaCl$_2$ | 20 |
| Hot water | 80 |
| Second mixture | |
| Soxinol D (diphenylguanidine, Sumitomo Chemical Co., Ltd.) | 5 |
| Ethanol | 10 |
| Hydrochloric acid | 3 |

The insolubilized dye was formulated into an ink using the following components.

| Composition of ink | |
|---|---|
| Insolubilized dye obtained above | 1 |
| No. 3 linseed oil varnish | 1 |

A graphic pattern was printed on a cotton fabric with this ink by a lithographic offset printing press, and the fabric was overcoated with the following coating agent by the same machine.

| Composition of coating agent | |
|---|---|
| Amino alcohol varnish (Godo Printing Ink Mfg. Co., Ltd.) | 10 |
| Potassium hydroxide | 1 |

After the ink and the coating agent dried, the fabric was steamed, soaped and rinsed by usual methods for aftertreatment.

The print had a black graphic pattern formed thereon with excellent tone reproduction.

EXAMPLE 25

A blue direct dye was insolubilized and thereby made oleophilic using the mixtures listed in Table 18.

TABLE 18

| | |
|---|---|
| First mixture | |
| Brilliant Fast Blue G conc (C.I. Direct Blue 86, Nankai Dyestuff Mfg. Co., Ltd.) | 2 |
| Alum cake | 5 |
| Anhydrous BaCl$_2$ | 20 |
| Hot water | 130 |
| Second mixture | |
| Soxinol D (diphenylguanidine, Sumitomo Chemical Co., Ltd.) | 5 |
| Ethanol | 10 |
| Hydrochloric acid | 3 |

The first and second mixtures were treated in the same manner as in Examples 10 to 21 and 24.

| Composition of ink | |
|---|---|
| Insolubilized dye prepared above | 1 |
| Web Offset Varnish QH-1000 (Toyo Ink Mfg. Co., Ltd.) | 1 |

A graphic pattern was printed on a cotton fabric with this ink by a lithographic offset printing press, and the fabric was overcoated with the following coating agent by the same machine.

| Composition of coating agent | |
|---|---|
| Amino alcohol varnish (Godo Printing Ink Mfg. Co., Ltd.) | 3 |
| SR707T (nonionic surfactant, Aoki Oil Industrial Co., Ltd.) | 1 |

After the ink and the coating agent dried, the fabric was steamed, soaped and rinsed by usual methods for aftertreatment. The print obtained exhibited a brilliant sky-blue graphic pattern.

EXAMPLE 26

Four kinds of direct dyes of different colors were insolubilized and thereby made oleophilic using the mixtures listed in Table 19.

TABLE 19

| | Insolubilized dyes | | | |
|---|---|---|---|---|
| Materials | Yellow | Red | Blue | Black |
| First mixture | | | | |
| Sumilight Yellow GR (C.I. Direct Yellow 148, Sumitomo Chemical Co., Ltd.) | 2 | | | |
| Nippon Brilliant Pink B conc (C.I. Direct Red 9, Sumitomo Chemical Co., Ltd.) | | 2 | | |
| Brilliant Fast Blue G conc (C.I. Direct Blue 86, Nankai Dyestuff Mfg. Co., Ltd.) | | | 2 | |
| Direct Fast Black B 160% (C.I. Direct Black 22, Sumitomo Chemical Co., Ltd.) | | | | 2 |
| Alum cake | 5 | 5 | 5 | 5 |
| Anhydrous BaCl$_2$ | 20 | 20 | 20 | 20 |
| Hot water | 130 | 130 | 130 | 130 |
| Second mixture | | | | |
| Soxinol D (diphenylguanidine, Sumitomo Chemical Co., Ltd.) | 5 | 5 | 5 | 5 |
| Ethanol | 10 | 10 | 10 | 10 |
| Hydrochloric acid | 3 | 3 | 3 | 3 |

The first and second mixtures were treated in the same manner as in Examples 10 to 21, 24 and 25.

These four kinds of insolubilized (oleophilic) dyes were formulated into four kinds of inks of the following composition, respectively.

| | |
|---|---|
| Insolubilized (oleophilic) dye | 1 |
| No. 3 linseed oil varnish | 1 |

A four-color photographic design was printed on a cotton fabric with these inks by a lithographic offset printing press, and the fabric was overcoated with the same coating agent as used in Example 25 by the same machine. After the inks and the overcoat dried, the fabric was steamed, soaped and rinsed by usual methods. The print obtained had high color densities and excellent color balance.

EXAMPLE 27

The same result as achieved in Examples 10 to 26 was achieved when the procedure of these examples was repeated using a relief printing press in place of the lithographic (direct) printing press or lithographic offset printing press employed in these examples.

EXAMPLE 28

The same result as achieved by Examples 11 to 26 was obtained when the procedure of these examples was repeated similarly with the exception of resorting to the dry offset (relief) method using a relief plate as attached to the lithographic printing press used in Examples 11 to 26.

EXAMPLE 29

The same result as achieved in Example 8 was obtained by repeating exactly the same procedure as in Example 8 except that the coating agent used in Example 8 was replaced by the following agent.

| Composition of coating agent | |
|---|---|
| Amino alcohol varnish (Godo Printing Ink Mfg. Co., Ltd.) | 3 |
| SR707T (nonionic surfactant, Aoki Oil Industrial Co., Ltd.) | 1 |

EXAMPLE 30

A blue direct dye was insolubilized and thereby made oleophilic using the mixtures listed in Table 20.

TABLE 20

| First mixture | |
|---|---|
| Brilliant Fast Blue G conc (C.I. Direct Blue 86, Nankai Dyestuff Mfg. Co., Ltd.) | 10 |
| Anhydrous sodium sulfate | 5 |
| Common salt | 5 |
| Silicic acid | 3 |
| Anhydrous barium chloride | 20 |
| Hot water | 250 |
| Second mixture | |
| Soxinol D (diphenylguanidine, Sumitomo Chemical Co., Ltd.) | 5 |
| Ethanol | 10 |
| Hydrochloric acid | 3 |

The first and second mixtures were treated in the same manner as in Examples 10 to 21 and 24 to 26.

| Composition of ink | |
|---|---|
| Insolubilized (oleophilic) dye obtained above | 1 |
| Linseed oil varnish | 0.5 |
| Super Toughner (Mitsuboshi Printing Ink Co., Ltd.) | 1 |
| Composition of coating agent | |
| Glycol varnish (Godo Printing Ink Mfg. Co., Ltd. | 30 |
| Sodium stearate | 9 |
| Sodium lauryl sulfate | 3 |
| Diethylene glycol | 1.5 |

A graphic pattern was printed on cotton fabrics with the blue ink thus prepared. The following three methods were used for printing.
(1) Usual lithographic offset printing with use of fountain solution.
(2) Lithographic offset printing with use of waterless lithographic plate.
(3) Printing by lithographic press with dry offset relief plate attached thereto.

At the same time, the fabrics were overcoated with the above coating agent over the entire surface using the same machine as used for printing. After the ink and the coating agent dried, the fabrics were steamed, soaped and rinsed by usual methods for aftertreatment. All the prints obtained exhibited a brilliant sky-blue graphic pattern.

EXAMPLE 31

Compositions of Inks

TABLE 21

| Components | Yellow ink | Red ink | Blue ink | Black ink |
|---|---|---|---|---|
| Chrysophenine G (C.I. Direct Yellow 12, Sumitomo Chemical Co., Ltd.) | 4 | | | |
| Nippon Fast Red BB conc (C.I. Direct Red 31, Sumitomo Chemical Co., Ltd.) | | 4 | | |
| Brilliant Fast Blue G conc (C.I. Direct Blue 86, Nankai Dyestuff Mft. Co., Ltd.) | | | 4 | |
| Japanol Fast Black D conc (C.I. Direct Black 154, Sumitomo Chemical Co., Ltd.) | | | | 4 |
| Ultra-gloss medium (Dainippon Ink & Chemicals, Inc.) | 10 | 10 | 10 | 10 |
| Glycol varnish (Godo Printing Ink Mfg. Co., Ltd.) | 4.3 | 4.3 | 4.3 | 4.3 |
| Sodium stearate | 1.3 | 1.3 | 1.3 | 1.3 |
| Sodium lauryl sulfate | 0.4 | 0.4 | 0.4 | 0.4 |

A color photographic pattern was printed on cotton fabrics with these four kinds of inks.

For printing, a lithographic offset printing press was used, which was equipped with:
(1) a waterless lithographic plate, or
(2) a dry offset relief plate.

At the same time, the fabrics were overcoated With the same coating agent as used in Example 30, by the same machine.

After the inks and the coating agents dried, the fabrics were steamed, soaped and rinsed by usual methods for aftertreatment. All the prints obtained had high color densities and good color balance.

EXAMPLE 32

Compositions of Inks

TABLE 22

| Components | Yellow-1 | Yellow-2 | Yellow-3 |
|---|---|---|---|
| Chrysophenine G (C.I. Direct Yellow 12, Sumitomo Chemical Co., Ltd.) | 4 | | |
| Sumilight Supra Yellow BC conc (C.I. Direct Yellow 28, Sumitomo Chemical Co., Ltd.) | | 4 | 4 |
| Glycol varnish (Godo Printing Ink Mfg. Co., Ltd.) | 16 | 10 | 12 |
| Triethanolamine | | 6 | |
| Myristylamine | | | 4 |
| Bentonite | | 2 | |
| KL965100CS (silicone oil, Shin-etsu Chemical Co., Ltd.) | 0.5 | | 0.5 |

Three kinds of yellow inks each incorporating a direct dye were prepared from the components listed in Table 22. A graphic pattern was printed on cotton fabrics with these inks using a lithographic offset printing press with a waterless lithographic plate attached thereto. At the same time, the printed fabrics were overcoated with the same coating agent as used in Examples 30 and 31 by the same machine. After the ink and the agent dried, the fabrics were steamed, soaped and rinsed by usual methods for aftertreatment. Yellow-1 ink produced a brilliant orange yellow pattern, and the other inks produced a vivid medium yellow pattern.

EXAMPLE 33

Compositions of Inks

TABLE 23

| Components | Black-1 | Black-2 |
|---|---|---|
| Direct Fast Black B 160% (C.I. Direct Black 22, Sumitomo Chemical Co., Ltd.) | 6 | 6 |
| Ultra-gloss medium (Dainippon Ink & Chemicals, Inc.) | 10 | 10 |
| Glycol varnish (Godo Printing Ink Mfg. Co., Ltd.) | 4.3 | |
| Amino alcohol varnish (Godo Printing Ink Mfg. Co., Ltd.) | | 6 |
| Sodium stearate | 1.3 | |
| Sodium lauryl sulfate | 0.4 | |

Two kinds of black inks incorporating a direct dye were prepared from the components shown in Table 23.

A graphic pattern was printed on cotton fabrics with these inks using a lithographic offset printing press with a waterless lithographic plate attached thereto. At the same time, each fabric was overcoated with a coating agent by the same machine.

Two kinds of coating agents were prepared; an amino alcohol varnish (Godo Printing Ink Mfg. Co., Ltd.) was used for Black-1, and the following coating agent for Black-2.

| Composition of coating agent | |
|---|---|
| Amino alcohol varnish | 10 |
| Potassium hydroxide | 1 |

After the ink and the coating agent dried, the fabrics were steamed, soaped and rinsed by usual method for after treatment. The prints obtained exhibited a black graphic pattern with outstanding tone reproduction.

What is claimed is:

1. A printing process which comprises printing by a lithographic or relief printing process onto the surface of a fabric made from natural or nylon fibers with a printing ink comprising a) a water-soluble dye reactive with the fabric which is to be printed and which is rendered insoluble by reaction with a metal salt, an amine or an amide, and b) at least one of an oil varnish, a glycol varnish and an amine varnish, said glycol varnish or amine varnish containing at least one of a basic compound, a hydrotropic agent, a neutral sodium salt, a surfactant, water and an alcohol, steaming the fabric, soaping the steamed fabric and rinsing the soaped fabric.

2. A process according to claim 1, wherein the glycol varnish or the amine varnish contains an acid-modified resin.

3. A process according to claim 1, wherein the surface of the fabric is coated before printing with a glycol varnish or an amine varnish containing at least one of a basic compound, a hydrotropic agent, a neutral sodium salt, a surfactant water and an alcohol.

4. A process according to claim 1, wherein the surface of the fabric is coated after printing with a glycol varnish or an amine varnish containing at least one of a basic compound, a hydrotropic agent, a neutral sodium salt, a surfactant water and an alcohol.

5. A process according to claim 1, wherein the surface of the fabric is coated before and after printing with a glycol varnish or an amine varnish containing at least one of a basic compound, a hydrotropic agent, a neutral sodium salt, a surfactant water and an alcohol.

* * * * *